(12) United States Patent
Bosmans et al.

(10) Patent No.: US 6,866,254 B2
(45) Date of Patent: *Mar. 15, 2005

(54) GAS-LIQUID CONTACT TRAY

(75) Inventors: Bernardinus Henricus Bosmans, Amsterdam (NL); Charu Ehrenreich-Gureja, Amsterdam (NL)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/204,083
(22) PCT Filed: Feb. 16, 2001
(86) PCT No.: PCT/EP01/01806
§ 371 (c)(1),
(2), (4) Date: Aug. 16, 2002
(87) PCT Pub. No.: WO01/60486
PCT Pub. Date: Aug. 23, 2001

(65) Prior Publication Data
US 2003/0011085 A1 Jan. 16, 2003

(30) Foreign Application Priority Data
Feb. 16, 2000 (EP) .............................. 00200523

(51) Int. Cl.[7] ................................................ B01F 3/04
(52) U.S. Cl. ................................. 261/114.1; 261/114.5
(58) Field of Search ............................. 261/114.1, 114.5

(56) References Cited

U.S. PATENT DOCUMENTS

| | | | |
|---|---|---|---|
| 2,682,395 A | * | 6/1954 | Claridge et al. ......... 261/114.1 |
| 3,410,540 A | | 11/1968 | Bruckert |
| 3,463,464 A | | 8/1969 | Nutter et al. |
| RE27,908 E | | 1/1974 | Nutter |
| 4,361,469 A | * | 11/1982 | Trutna ........................ 203/99 |
| 4,550,000 A | | 10/1985 | Bentham |
| 4,627,941 A | | 12/1986 | Bentham |
| 5,098,615 A | | 3/1992 | Resetarits |
| 5,120,474 A | | 6/1992 | Binkley et al. |
| 5,223,183 A | | 6/1993 | Monkelbaan et al. |
| 5,244,604 A | * | 9/1993 | Miller et al. .................. 261/97 |
| 5,318,732 A | | 6/1994 | Monkelbaan et al. |
| 5,382,390 A | | 1/1995 | Resetarits et al. |
| 5,454,989 A | | 10/1995 | Nutter |
| 5,911,922 A | | 6/1999 | Hauser et al. |

FOREIGN PATENT DOCUMENTS

| | | |
|---|---|---|
| BE | 584.426 | 11/1959 |
| DE | 764103 | 9/1952 |
| EP | 0 155 056 | 9/1985 |
| EP | 0 882 481 A1 | 9/1998 |
| GB | 1 416 731 | 12/1975 |
| GB | 1 416 732 | 12/1975 |
| GB | 1 422 131 | 1/1976 |
| GB | 1 422 132 | 1/1976 |
| WO | 96 26779 | 9/1996 |
| WO | 97 37741 | 10/1997 |
| WO | 98 28056 | 7/1998 |
| WO | 99 12621 | 3/1999 |

OTHER PUBLICATIONS

Distillation Design, Henry Z. Kister, McGraw–Hill. Inc., 1992, pp. 259–267.
Distillation Design, Henry Z. Kister, McGraw–Hill, Inc., 1992, pp. 267–291.
Distillation Design, Henry Z. Kister, McGraw–Hill Inc., 1992, pp. 260–267.

* cited by examiner

Primary Examiner—Scott Bushey

(57) ABSTRACT

A gas-liquid contact tray having a bubble area and one or more downcomers provided at its upper end with a downcomer opening for receiving liquid, wherein the downcomer opening and downcomer are provided with a flow directing plate, wherein the flow directing plate has an upper end which extends horizontally in the direction of the bubble area.

17 Claims, 1 Drawing Sheet

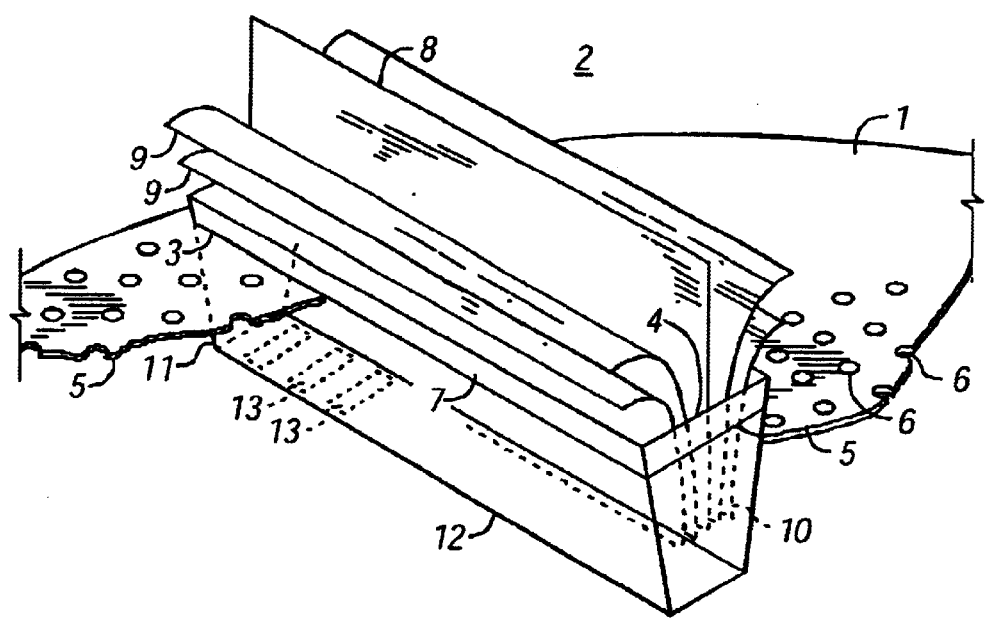
*FIGURE* 1

GAS-LIQUID CONTACT TRAY

FIELD OF THE INVENTION

The invention is related to a gas-liquid contact tray comprising a bubble area and one or more downcomers provided at its upper end with a downcomer opening for receiving liquid. Such trays can be used in gas liquid contacting devices. A typical use of these trays is as distillation column internals.

BACKGROUND OF THE INVENTION

German patent publication 764103 describes the use of flat and curved impingement plates in the downcomer opening to limit the froth height in the downcomer. The publication is directed to so-called cross-over tray configurations for use in so-called foaming gas-liquid systems. FIG. 4 of this publication discloses an embodiment wherein three curved plates are placed in the downcomer opening. The tangent at the upper end of the illustrated plates form an angle with the horizontal of more than zero degrees.

When trying to increase the liquid and/or gas flows of the gas-liquid contacting columns as described above a maximum load will be observed. Higher loads will result in that the column fails to function as a liquid-gas contactor or separator due to a phenomena known as flooding. Flooding is described as excessive accumulation of liquid inside the column. The well known flooding mechanisms are downcomer back-up, jet flooding and downcomer choking. These mechanisms are described in Distillation Design, Henry Z. Kister, McGraw-Hill Inc., 1992, pages 267–291. According to this publication downcomer back-up is due to a build-up of liquid inside the downcomer causing the liquid to back-up on the tray leading to liquid accumulation on that tray. The liquid height in the downcomer is determined by the tray pressure drop, liquid height on the tray and frictional losses in the downcomer and downcomer slot area. Jet flooding or entrainment flooding is caused by a too high gas velocity leading to the entrainment of liquid, either by droplets or froth, to the tray above. The liquid will accumulate and leads to flooding. Downcomer choking is caused by a too high aerated liquid velocity in the downcomer. At a certain velocity the friction losses in the downcomer and downcomer entrance become excessive, and the frothy gas-liquid mixture cannot be transported to the tray below, causing liquid accumulation on the tray. With the term froth is to be understood any gas-liquid mixture present on the tray not depending on any flow regime.

The present invention aims to provide a gas-liquid contacting tray as described above which permits a higher gas and/or liquid loads. Thus a tray is aimed at having an improved capacity. This aim is achieved by the following tray.

SUMMARY OF THE INVENTION

The invention relates to a gas-liquid contact tray comprising a bubble area and one or more downcomers provided at its upper end with a downcomer opening for receiving liquid, wherein the downcomer opening and downcomer are provided with a flow directing plate, wherein the flow directing plate has an upper end which extends horizontally in the direction of the bubble area.

It has been found that when the tray according to the invention is used in a gas-liquid contacting column an improved capacity is observed.

The gas-liquid contact tray according to the invention will typically comprise a circular bubble area, one or two segmental downcomer openings and optionally a plurality of further downcomer openings spaced in this bubble area. The downcomer opening may be any form, for example, segmental, rectangular, square or circular.

BRIEF DESCRIPTION OF THE DRAWINGS

The invention will be illustrated in more detail on the basis of the following examples together with the FIGURE. The examples should not be construed to limit the scope of the invention.

The FIGURE is a three-dimensional view of part of a tray according to the invention as placed in a column.

DETAILED DESCRIPTION OF THE INVENTION

The invention shall be described in greater detail below.

Preferably a weir is present on the tray. A weir is a device positioned on or about on the boundary of the bubble area and the downcomer opening which ensures that a certain pre-selected amount of liquid is present on the upper surface of the bubble area. The height of the weir may be selected from conventional values known to one skilled in the art. The weir may suitably be inclined towards the direction of the liquid flowing towards the downcomer opening. To further improve the liquid handling capacity the overflow weir is preferably inclined towards the bubble area, such that an imaginary line, drawn from the top of the overflow weir to the base of the overflow weir, forms an angle a with the horizontal plane of the tray which is smaller than 80° and more preferably larger than 30°. The overflow weir height lies preferably in the range from 25 mm to ⅙ of the height of the tray spacing.

The upper end of the directing plate extends horizontally in the direction of the bubble area. In other words the tangent line at the upper end of the plate is horizontally positioned.

The number of directing means can be from 1 to 10. This number will for example depend on the position of the downcomer opening on the tray. In case of a downcomer opening positioned at the side of the tray, as for example the segmental downcomer of DE-A-764103, the number of plates will preferably be from 1 and 4 and more preferably from 2 to 4.

In case the downcomer openings are spaced in the bubble area, such that, when in use, a liquid enters the downcomer opening from opposite sides of the downcomer opening the number of directing plates will preferably be from 2 to 10 and more preferably from 4 to 6. When substantially the same amount of froth is expected to flow from both sides of such a downcomer it is preferred to have the same number of directing plates inclined towards each of the flow directions. When more froth is expected to flow from one side, more directing plates having an upper end being inclined in that direction may be present than directing plates pointing towards the side where less froth is flowing from. When the downcomer opening is rectangular shaped an anti-jump baffle may be present as for example described in U.S. Pat. No. 5,382,390. The flow directing plates can then be advantageously positioned at either side of the anti-jump baffle.

The directing plates suitably have a lower end which is directed towards the downcomer opening. The lower end may be positioned above tray level. Preferably the lower part of the directing plate extends downwards into the downcomer.

The lower part of the directing plates may be vertically positioned or inclined relative to each other. The lower end is preferably positioned at the level of the upper end of the weir or below. In the absence of a weir, the lower end is preferably positioned at tray level or below. The length of the lower end below the tray level or top weir level will depend, for example, on the spacing between the individual directing plates. Smaller spacing will generally require that this distance increases. Optionally the different directing plates may extend with different lengths into the downcomer.

The upper part of the directing plates may be for example hooked or curved. For practical plate manufacturing reasons a hooked design is favored. The upper end of the directing plate may extend to a position above the bubble area. Preferably the height of the directing plates above the tray surface increases when they are positioned further away from the bubble area. The vertical distance between the horizontal tangent lines of two consecutive plates will preferably increase at increasing height above the tray.

Suitably the horizontal distance at top weir level (or tray level in the absence of a weir) between two consecutive directing plates bending in the same direction is between from 0.015 m to 0.1 m and preferably between from 0.015 m to 0.05 m.

The distance of the directing plate above the tray will depend on the shape of the directing plate, typical gas and liquid loading on the tray and the kind of gas and liquid to be contacted or separated. Suitably the directing plates will extend to between from 5% to 85% of tray spacing above the tray surface, wherein tray spacing is the distance between two consecutive contacting trays when placed in a column. Suitably the tray spacing is between from 0.2 m to 1 m.

The directing plates may be solid, partly perforated, perforated with a varying open area or with a constant open area. The shape of the perforations might be any shape. For example materials like expanded metal or other corrugated sheet material could be used to make the directing plates. Preferably the directing plate is a solid metal sheet.

Various possible tray layouts of the downcomer openings present in the bubble area of the tray are known to one skilled in the art. Examples of such tray lay outs which may advantageously be used in combination with the present invention are disclosed in GB-A-1422132, GB-A-1422131, GB-A-1416732, GB-A-1416731, BE-584426, U.S. Pat. No. 4,550,000, EP-A-882481, WO-9626779, U.S. Pat. No. 5,382,390, U.S. Pat. No. 3,410,540, U.S. Pat. No. 5,318,732, EP-A-155056, U.S. Pat. No. 5,223,183 and U.S. Pat. No. 5,098,615.

For the present invention it is not critical which kind of openings are used in the bubble area of the tray. Examples of possible openings are sieve tray openings, valve tray openings, bubble cap openings and fixed valve openings. Examples of these openings can be found in general text books such as the aforementioned general textbook of Kister on pages 260–267 and in US-RE-27908, U.S. Pat. No. 5,120,474, WO-A-9828056, WO-A-9737741, U.S. Pat. No. 5,911,922, U.S. Pat. No. 3,463,464 and U.S. Pat. No. 5,454,989.

The invention shall be illustrated with the following Figures.

DETAILED DESCRIPTION OF THE DRAWINGS

The FIGURE is three-dimensional view of part of a tray 1 part of a column wall 2 and a downcomer 3 having a rectangular downcomer opening 4. As shown bubble area 5 is present along both elongated sides of the downcomer opening 4. The bubble area 5 is provided with openings 6 for passage of upwardly moving gas. The downcomer 3 is also provided with a weir 7 and an anti jump baffle 8. Two flow directing plates 9 are positioned at either side of the anti jump baffle 8. As shown the tangent line at the upper end of the plate 9 runs horizontal. Because the flows towards the rectangular downcomer opening 4 will be predominately from both of the elongated sides of the downcomer 3, the flow directing plates 9 only point towards these elongated sides. The flow directing plates 9 as shown are substantially parallel and vertically arranged at their lower end 10. The upper end is curved such that they point horizontally towards the opposite liquid flows flowing, when in use, from the spaces above bubble area 5 into the downcomer opening 4. The elongated upper end runs parallel to the elongated sides of the downcomer 3. The downcomer walls 11 point towards each other in the flow direction of the liquid. The lower end of the downcomer is provided with a cover 12. In the cover 12 a plurality of openings 13 are present.

The tray according to the invention is preferably used in a gas-liquid contacting or separation column, which column is provided with these trays axially spaced away from each other. Contacting can be an absorption process wherein a downwardly moving liquid is contacted with an upwardly moving gas. Separation is typically a distillation process to separate one or more components from a feed. Typically the feed of a distillation process is supplied to an intermediate position in the column, wherein trays are present above and below said inlet position. Such a column is further provided with reboiler, condensation and reflux means.

The column is preferably used for the contacting or separation of gas-liquid systems of the foaming and non-foaming type. The advantages of the present invention are especially achieved for non-foaming type systems because downcomer back up is a more frequent problem for such systems. Non-foaming systems have a typically higher clear liquid velocity in the downcomer than foaming systems. Examples of foaming systems are amine-absorbers, sour water strippers, glycerol contactors and amine absorbers. Examples of non-foaming systems are $H_2S$ strippers and hydrocarbon-hydrocarbon separation, for example de-propanizers, de-ethanizers, de-methanizers, atmospheric crude distillation and the vacuum distillation of petroleum fractions boiling from above 350°.

The invention shall be illustrated with the following non-limiting examples.

Comparative Experiment A

A test unit is provided with 3 cross-flow trays each tray provided with a rectangular downcomer. The downcomers are provided with two directing plates. The upper end of the vanes are so positioned that the tangent line makes an angle of 60° with the horizontal plane. The horizontal distance between the plates at weir level is 0.025 m. To this column a liquid and gas flow is introduced at respective upper and lower ends. At an air load of 340 $m^3$/h it is observed that the maximum attainable water load is approximately 18.1 $m^3$/h.

EXAMPLE 1

Comparative experiment A is repeated except that the upper end of the vanes are so positioned that the tangent line makes an angle of 0° with the horizontal plane, such that the vanes extend horizontal according to the present invention. At an air load of 340 $m^3$/h it is observed that the maximum attainable water load is greater than 18.1 $m^3$/h.

Comparative Experiment B

Example 1 is repeated except that a downcomer is used having no flow directing plates. At an air load of 340 m³/h it is observed that the maximum attainable water load is approximately 14.5 m³/h.

What is claimed is:

1. A gas-liquid contact tray comprising a bubble area and a downcomer providing at its upper end for a weir having a height above the bubble area and defining a downcomer opening for receiving liquid, wherein the downcomer opening and downcomer are provided with at least two flow directing plates, wherein each of the at least two flow directing plates has an upper end and a lower end, wherein the upper end of each of the at least two flow directing plates extends horizontally above the weir in the direction of the bubble area and extends to a position above the bubble area, and wherein the lower end of each of the at least two flow directing plates extends downwardly into the downcomer opening defined by the downcomer.

2. The tray according to claim 1, wherein the number of the at least two flow directing plates is from 2 to 6.

3. The tray according to claim 1, wherein the horizontal distance at top weir level between two consecutive flow directing plates extending in the same direction is between from 0.015 to 0.05 m.

4. The tray according to claim 1, wherein the lower end of each of the flow directing plates is positioned below the level of the upper end of the weir.

5. The tray according to claim 1, wherein the upper end of each of the at least two flow directing plates extends to between from 5% and 85% of tray spacing above the tray surface, wherein tray spacing is the distance between two consecutive trays when placed in a gas-liquid contacting column.

6. The tray according to claim 1, wherein the downcomer opening is rectangular.

7. A gas-liquid contact tray comprising a bubble area and a downcomer providing at its upper end for a weir having a height above said bubble area and defining a rectangular downcomer opening for receiving liquid, wherein the rectangular downcomer opening and downcomer is provided with a flow directing plate, wherein the flow directing plate has an upper end which extends horizontally above said weir in the direction of the bubble area and extends to a position above the bubble area, and wherein a vertical anti-jump baffle is present along the longitudinal center line of the rectangular downcomer opening and wherein the flow directing plates are positioned at either side of the anti-jump baffle.

8. The tray according to claim 1, wherein a weir is present on the boundary of bubble area and downcomer opening.

9. A gas-liquid contacting column provided with a plurality of trays according to claim 1, axially spaced from each other.

10. A gas-liquid contact tray comprising a bubble area and one or more downcomers provided at its upper end with a downcomer opening for receiving liquid, wherein the downcomer opening and downcomer is provided with a flow directing plate, wherein the flow directing plate has an upper end which extends horizontally in the direction of the bubble area and extends to a position above the bubble area, wherein the downcomer opening is rectangular, wherein a vertical anti-jump baffle is present along the longitudinal center line of the downcomer opening, and wherein the flow directing plates are positioned at either side of the anti-jump baffle.

11. A gas-liquid contact tray according to claim 10, wherein a weir is present on the boundary of the bubble area and downcomer opening.

12. The tray according to claim 1, wherein said downcomer further having an elongated side that defines the downcomer opening and wherein the upper end of each of the at least two flow directing plates runs parallel to the elongated side.

13. The tray according to claim 1, wherein the upper end of each of the at least two flow directing plates is curved such that it points horizontally away from the downcomer opening.

14. A gas-liquid contact tray comprising:
a planar bubble area;
a downcomer having elongated sides that defines a downcomer opening for receiving liquid and which provides at its upper end for a weir having a height above said planar bubble area;
at least two flow directing plates that are spaced apart;
wherein each of said at least two flow directing plates has a lower end and an upper end;
wherein each of said lower end of said at least two flow directing plates extends downwardly into said downcomer opening of said downcomer to a location below said height above said planar bubble area and wherein said lower ends of said at least two flow directing plates are vertically arranged and substantially parallel with each other; and
wherein each of said upper end of said at least two flow directing plates is curved to form a horizontal tangent that is horizontal to said planar bubble area and extends horizontally above said weir into the direction of said planar bubble area and to a position above said planar bubble area.

15. A gas-liquid contact tray as recited in claim 14, wherein said at least two flow directing plates includes from 2 to 10 flow directing plates.

16. A gas-liquid contact tray as recited in claim 15, wherein the distance between each said horizontal tangent of each of said at least two flow directing plates is between 0.015 to 0.05 m.

17. A gas-liquid contact tray as recited in claim 16, further comprising:
a vertical anti-jump baffle positioned along the longitudinal center line of said downcomer opening.

* * * * *